United States Patent
Kosaka

(10) Patent No.: US 8,500,221 B2
(45) Date of Patent: Aug. 6, 2013

(54) TRAVELING APPARATUS AND BRAKING CONTROL METHOD FOR THE TRAVELING APPARATUS

(75) Inventor: Yusuke Kosaka, Chofu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 886 days.

(21) Appl. No.: 12/376,241

(22) PCT Filed: Aug. 1, 2007

(86) PCT No.: PCT/JP2007/065054
§ 371 (c)(1),
(2), (4) Date: Feb. 3, 2009

(87) PCT Pub. No.: WO2008/016074
PCT Pub. Date: Feb. 7, 2008

(65) Prior Publication Data
US 2009/0315293 A1 Dec. 24, 2009

(30) Foreign Application Priority Data
Aug. 3, 2006 (JP) .................. 2006-212389

(51) Int. Cl.
*B60T 8/64* (2006.01)
*B62D 61/00* (2006.01)

(52) U.S. Cl.
USPC ......................................... 303/152; 180/218

(58) Field of Classification Search
USPC .................. 303/152, 154, 155, 160; 180/21, 180/218, 65.31, 65.1; 318/375, 566
See application file for complete search history.

(56) References Cited

U.S. PATENT DOCUMENTS

| 5,433,512 A | 7/1995 | Aoki et al. |
| 6,288,505 B1 | 9/2001 | Heinzmann et al. |

(Continued)

FOREIGN PATENT DOCUMENTS

| JP | 11 500331 | 1/1999 |
| JP | 2003 305088 | 10/2003 |

(Continued)

OTHER PUBLICATIONS

Office Action issued Dec. 23, 2011 in Chinese Application No. 200780028983.8 (With English Translation).

(Continued)

*Primary Examiner* — Anna Momper
(74) *Attorney, Agent, or Firm* — Oblon, Spivak, McClelland, Maier & Neustadt, L.L.P.

(57) ABSTRACT

A parallel two-wheeled vehicle including a braking mechanism to directly brake two wheels that includes: a body; a pair of drive units coaxially mounted to the body; a T-shaped handle to be gripped by a passenger; a longitudinal inclination detecting device of the body; and a brake lever. A brake detecting device detects operational information of the brake lever. The body includes: a vehicle speed detecting device to determine a vehicle speed based on a relative angular velocity between the body and the wheels, which is detected by the drive units and based on an angular velocity detected by the longitudinal inclination detecting device; a target speed setting device to set a target vehicle speed based on an output of each of the brake detecting device and the vehicle speed detecting device; and a stabilization control device to control the vehicle to stably follow the target angle/target angular velocity/target vehicle speed. Further, powder brakes are incorporated in the drive units, respectively.

6 Claims, 15 Drawing Sheets

U.S. PATENT DOCUMENTS

| | | | |
|---|---|---|---|
| 6,345,675 B1 * | 2/2002 | Hueber | 180/21 |
| 6,868,931 B2 * | 3/2005 | Morrell et al. | 180/170 |
| 2003/0169002 A1 * | 9/2003 | Hughes | 318/376 |
| 2005/0264102 A1 * | 12/2005 | Tezuka | 303/152 |

FOREIGN PATENT DOCUMENTS

| | | |
|---|---|---|
| JP | 2004 267000 | 9/2004 |
| JP | 2004 276727 | 10/2004 |
| JP | 2004 345608 | 12/2004 |
| JP | 2005-145296 | 6/2005 |
| JP | 2006 27530 | 2/2006 |
| JP | 2006 131115 | 5/2006 |
| JP | 2006 211899 | 8/2006 |

OTHER PUBLICATIONS

Japanese Office Action issued Aug. 16, 2011, in Patent Application No. 2006-212389 (with English-language Translation).

* cited by examiner

TRAVELING APPARATUS AND BRAKING CONTROL METHOD FOR THE TRAVELING APPARATUS

TECHNICAL FIELD

The present invention relates to a traveling apparatus suitable for use in a parallel two-wheeled vehicle traveling by two wheels with a person riding thereon, for example, and to a braking control method for the traveling apparatus. In particular, when a parallel two-wheeled vehicle is provided with braking means to brake wheels directly, satisfactory braking control is carried out.

BACKGROUND ART

A vehicle traveling by two wheels with a person riding thereon, for example, is proposed (for example, see Patent Document 1).

Further, the inventor of the present invention has previously proposed to provide braking means to a parallel two-wheeled vehicle (for example, see Patent Document 2).

However, neither Patent Document 1 nor Patent Document 2 discloses the case where the braking means to brake wheels directly is provided to a parallel two-wheeled vehicle to carry out braking.

[Patent Document 1] Specification of U.S. Pat. No. 6,288,505
[Patent Document 2] Japanese Unexamined Patent Application Publication No. 2006-131115

DISCLOSURE OF THE INVENTION

Problems to be solved by the Invention

As a vehicle traveling by two wheels with a person riding thereon, for example, an apparatus as disclosed in Patent Document 1 is proposed. According to the related art, however, the position and speed of the vehicle are controlled merely by moving the center of mass of a passenger. Thus, it is necessary to control the vehicle constantly by moving the center of mass in such cases that the passenger desires to rapidly reduce the speed if he/she feels there is a danger or the passenger desires to come to a standstill because of a narrow space. This causes such problems that the rapid movement of the center of mass cannot keep up with deceleration and a highly sophisticated technique is necessary to remain at a standstill in a narrow space.

On the other hand, the inventor of the present invention has previously proposed a technique in which braking means is provided to a parallel two-wheeled vehicle as disclosed in Patent Document 2. That is, according to the invention disclosed in Patent Document 2, there are provided a brake lever, a brake detecting device that detects operational information of the brake lever, and a target speed setting device that sets a target vehicle speed based on an output of each of the brake detecting device and the vehicle speed detecting device, and control is performed such that the vehicle follows the vehicle speed set by the target speed setting device, thereby performing satisfactory braking at the time of operating the brake lever.

However, in the vehicle traveling by two wheels with a person riding thereon, for example, the deceleration is set to be larger than the acceleration as a general design specification. In this case, according to the related art described above, the acceleration/deceleration is performed using only a torque of a motor, which inevitably requires a high-output motor in order to generate a large deceleration and which leads to an increase in weight, power consumption, and cost. That is, conventionally, it is necessary to use a motor having higher performance than that necessary for normal traveling in order to set a torque generated during braking to be larger than a drive torque generated during traveling.

This application has been made in view of such problems. The problems to be solved by the invention are as follows. That is, it is necessary for the conventional apparatus to use a motor having higher performance than that necessary for normal traveling, which inevitably requires a high-output motor and which leads to an increase in weight, power consumption, and cost.

Means for Solving the Problems

Hence, the present invention provides braking means to directly brake two wheels, thereby enabling the deceleration at a deceleration larger than a deceleration that can be generated by a motor alone. Accordingly, it is not necessary to use a large motor for generating a large deceleration, and it is possible to prevent an increase in weight, power consumption, and cost. Further, a satisfactory braking control method used in combination of the braking means is proposed.

Advantageous Effects of the Invention

According to claim 1 of the present invention, braking means to brake two wheels directly is provided. The braking means brakes the two wheels in accordance with an operation amount of brake operation means when a drive torque of each of the two wheels, which is set by drive means, is set in a direction opposite to a traveling direction of a housing, thereby enabling satisfactory braking in a parallel two-wheeled vehicle.

According to claim 2 of the present invention, when the drive torque of each of the two wheels, which is set by the drive means, is equal to or smaller than a predetermined value and/or when the drive torque of each of the two wheels acts in a direction identical with the traveling direction of the housing, the drive means brakes the two wheels, thereby enabling satisfactory braking in the parallel two-wheeled vehicle.

According to claim 3 of the present invention, when the drive torque of each of the two wheels, which is set by the drive means, is set in a direction opposite to the traveling direction of the housing, braking of the two wheels is carried out using a combination of the drive means and the braking means, thereby enabling more satisfactory braking control in the parallel two-wheeled vehicle.

According to claim 4 of the present invention, a braking torque of the braking means is controllable, and both the braking torque and the drive torque of each of the two wheels, which is set by the drive means, are controlled, thereby enabling more stable braking control in the parallel two-wheeled vehicle.

According to claim 5 of the present invention, when the drive torque of each of the two wheels, which is set by the drive means, is 0, braking is carried out to stop the two wheels by using the braking means, thereby achieving a parking brake in the parallel two-wheeled vehicle.

According to claim 6 of the present invention, the two wheels can be braked directly, and the two wheels are braked directly when the set drive torque of each of the two wheels is set in the direction opposite to the traveling direction of the housing, thereby enabling satisfactory processing in the parallel two-wheeled vehicle.

Thus, in the conventional apparatus, when the deceleration is set to be larger than the acceleration, it is necessary to use a motor having higher performance than that necessary for normal traveling, which inevitably requires a high-output motor and which leads to an increase in weight, power consumption, and cost, whereas the present invention can easily solve these problems.

Figure 1A:
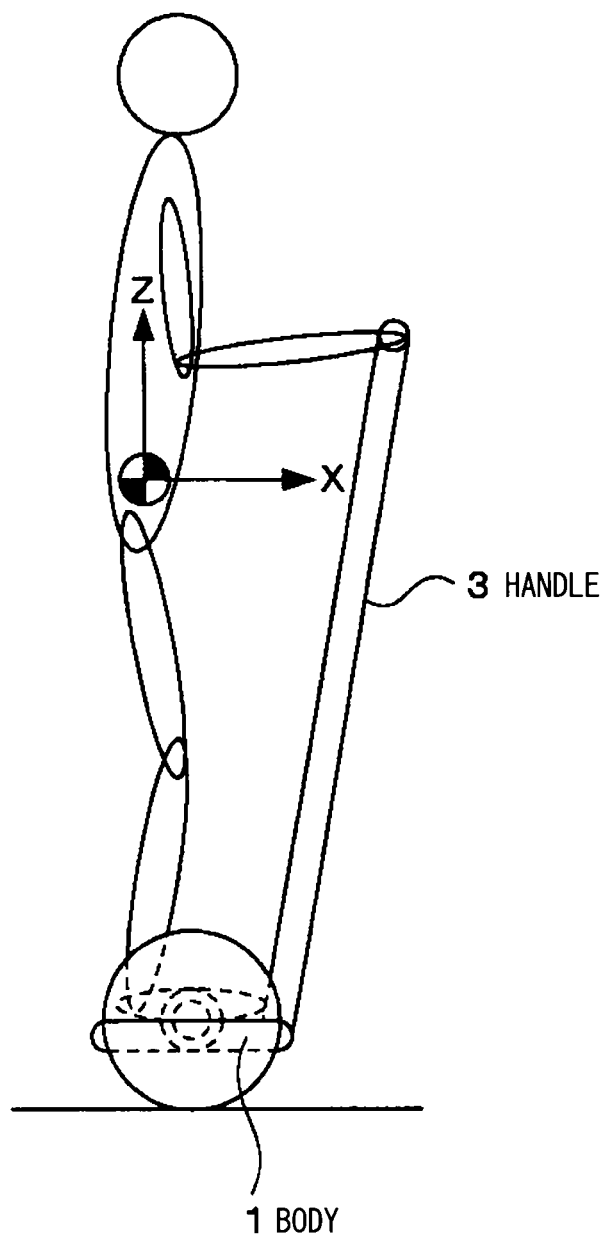
FIG. 1A is a structural diagram showing one embodiment of a parallel two-wheeled vehicle to which a traveling apparatus and a braking control method for the traveling apparatus according to the present invention are applied.

DESCRIPTION OF REFERENCE SYMBOLS 1 body
2A, 2B drive unit
3 handle
4 inclination detecting device
5 brake lever
6 brake detecting device
7 vehicle speed detecting device
8 target speed setting device
9 stabilization control device
10A, 10B powder brake

BEST MODES FOR CARRYING OUT THE INVENTION

That is, the traveling apparatus according to the present invention includes: drive means that independently drives two wheels arranged in parallel, and a housing that couples the two wheels. The housing is provided with detection means that detects a posture angle of the house, and brake operation means. In accordance with the detected information about the posture angle, the traveling apparatus travels by setting a drive torque of each of the two wheels, and controls a drive torque of each of the two wheels, which is set by the drive means according to an operation amount of the brake operation means, thereby controlling the two wheels. Braking means that directly brakes the two wheels is provided, and the braking means carries out braking of the two wheels according to the operation amount of the brake operation means, when the drive torque of each of the two wheels, which is set by the drive means, is set in a direction opposite to a traveling direction of the housing.

Further, the braking control method for the traveling apparatus according to the present invention includes: independently driving two wheels arranged in parallel; detecting a posture angle of a housing to couple the two wheels; traveling by setting a drive torque of each of the two wheels in accordance with the detected information about the posture angle; detecting an operation amount of the brake operation means; and controlling a drive torque of each of the two wheels according to the operation amount of the brake operation means to carry out braking of the two wheels. According to the braking control method, the two wheels can be braked directly and the two wheels are braked directly when the set drive torque of each of the two wheels is set in a direction opposite to the traveling direction of the housing.

Figure 1B:
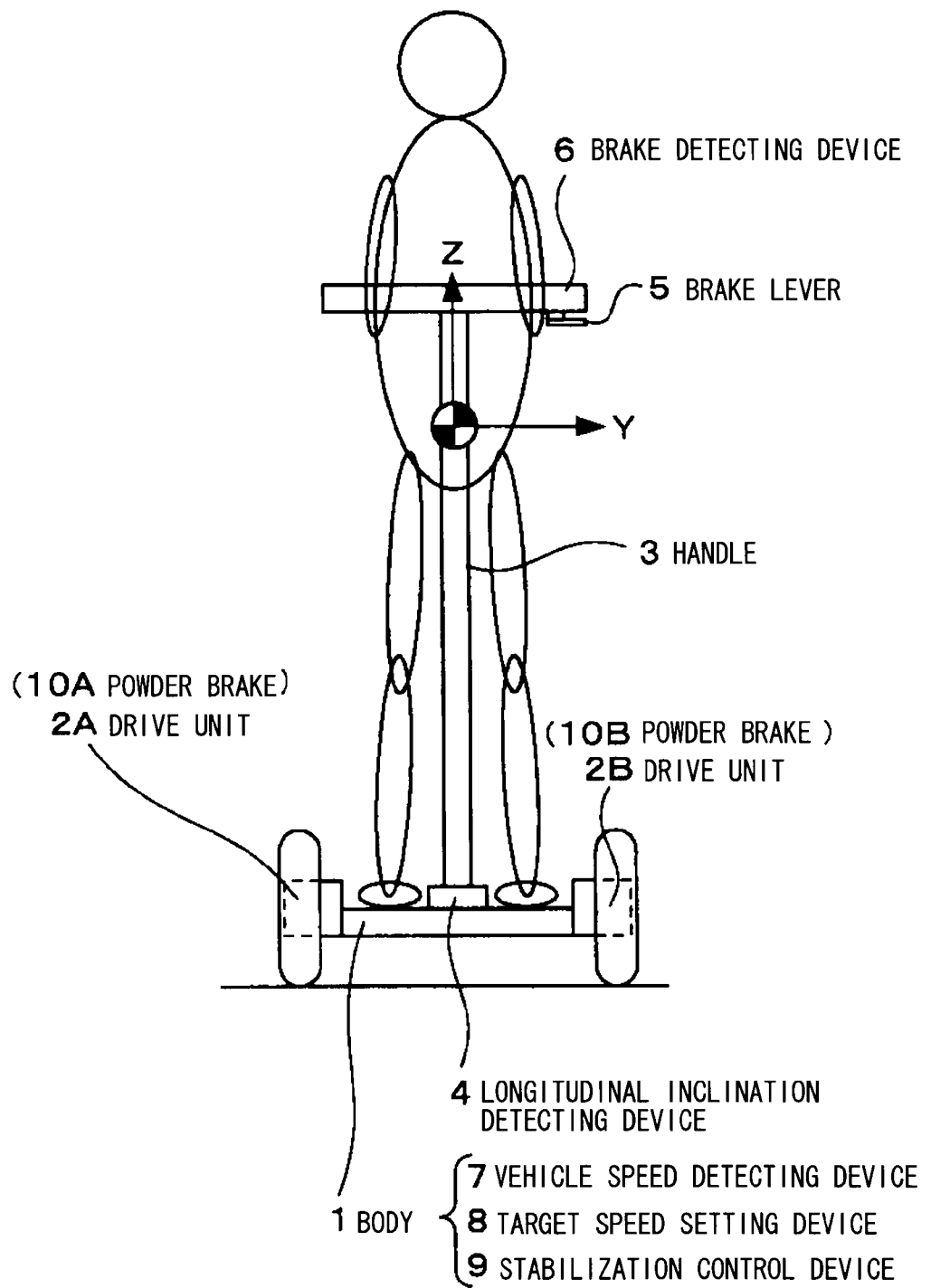
FIG. 1B is a structural diagram showing one embodiment of the parallel two-wheeled vehicle to which the traveling apparatus and the braking control method for the traveling apparatus according to the present invention are applied.

Hereinafter, the present invention will be described with reference to the drawings. FIG. 1 show the structure of an embodiment of a parallel two-wheeled vehicle to which the traveling apparatus and the braking control method for the traveling apparatus according to the present invention are applied. Note that FIG. 1A shows a front view and FIG. 1B shows a side view. In FIG. 1, the parallel two-wheeled vehicle according to the present invention includes: a body (portion on which a passenger stands) 1; a pair of drive units 2A and 2B coaxially mounted to the body 1; a T-shaped handle 3 to be gripped by the passenger; a longitudinal (about Y-axis) inclination detecting device 4 of the body 1; and a brake lever 5.

Further, the base of the brake lever 5 is provided with a brake detecting device 6 that detects operational information (operation amount, operation speed) of the brake lever 5. Furthermore, the body 1 includes: a vehicle speed detecting device 7 that determines a vehicle speed based on a relative angular velocity between the body and wheels, which is detected by the drive units 2A and 2B, and based on an angular velocity detected by the longitudinal inclination detecting device 4; a target speed setting device 8 that sets a target vehicle speed based on an output of each of the brake detecting device 6 and the vehicle speed detecting device 7; and a stabilization control device 9 that controls the vehicle to stably follow its target angle/target angular velocity/target vehicle speed.

Moreover, powder brakes 10A and 10B are incorporated in the drive units 2A and 2B, respectively. Herein, the powder brake refers to such a machine element that generates a friction torque proportional to a control current caused to flow, and is widely put to practical use as a brake for a rotary machine and the like.

Figure 2:
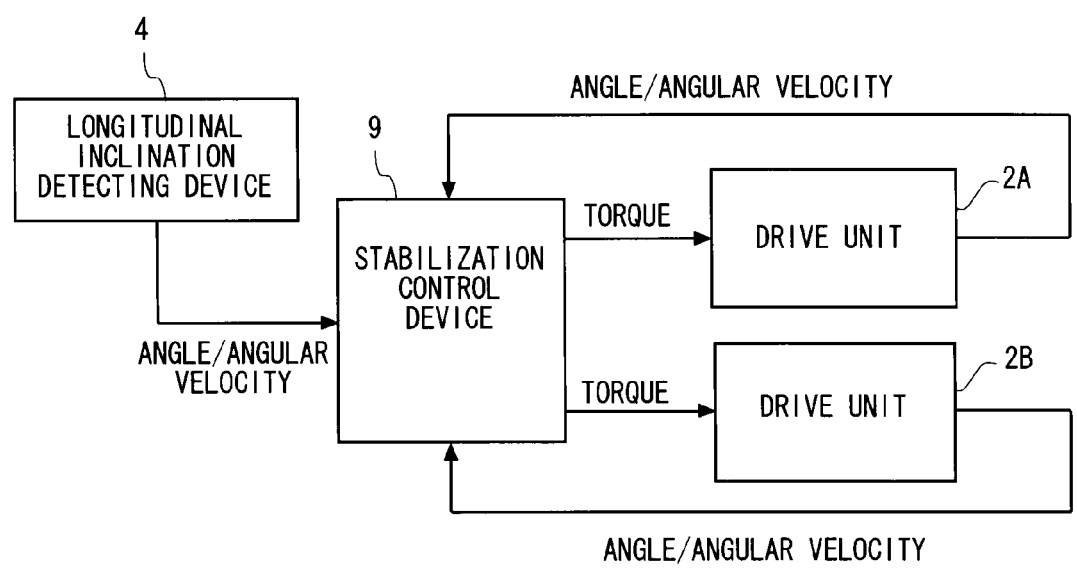
FIG. 2 is a functional block diagram for illustrating an operation thereof.

Next, an operation executed during normal traveling (when the brake lever is not operated) is described with reference to FIG. 2. That is, as shown in FIG. 2, a drive torque necessary for the control device 9 to stabilize the whole system in order to prevent the whole system from falling down is calculated based on the relative angle/angular velocity between the body and the wheels, which is detected by the drive units 2A and 2B, and based on the angle/angular velocity detected by the longitudinal inclination detecting device 4, thereby driving motors of the drive units 2A and 2B. Thus, a forward/backward movement and acceleration/deceleration can be performed when the passenger shifts the center of mass in the front-and-back direction.

Figure 3:
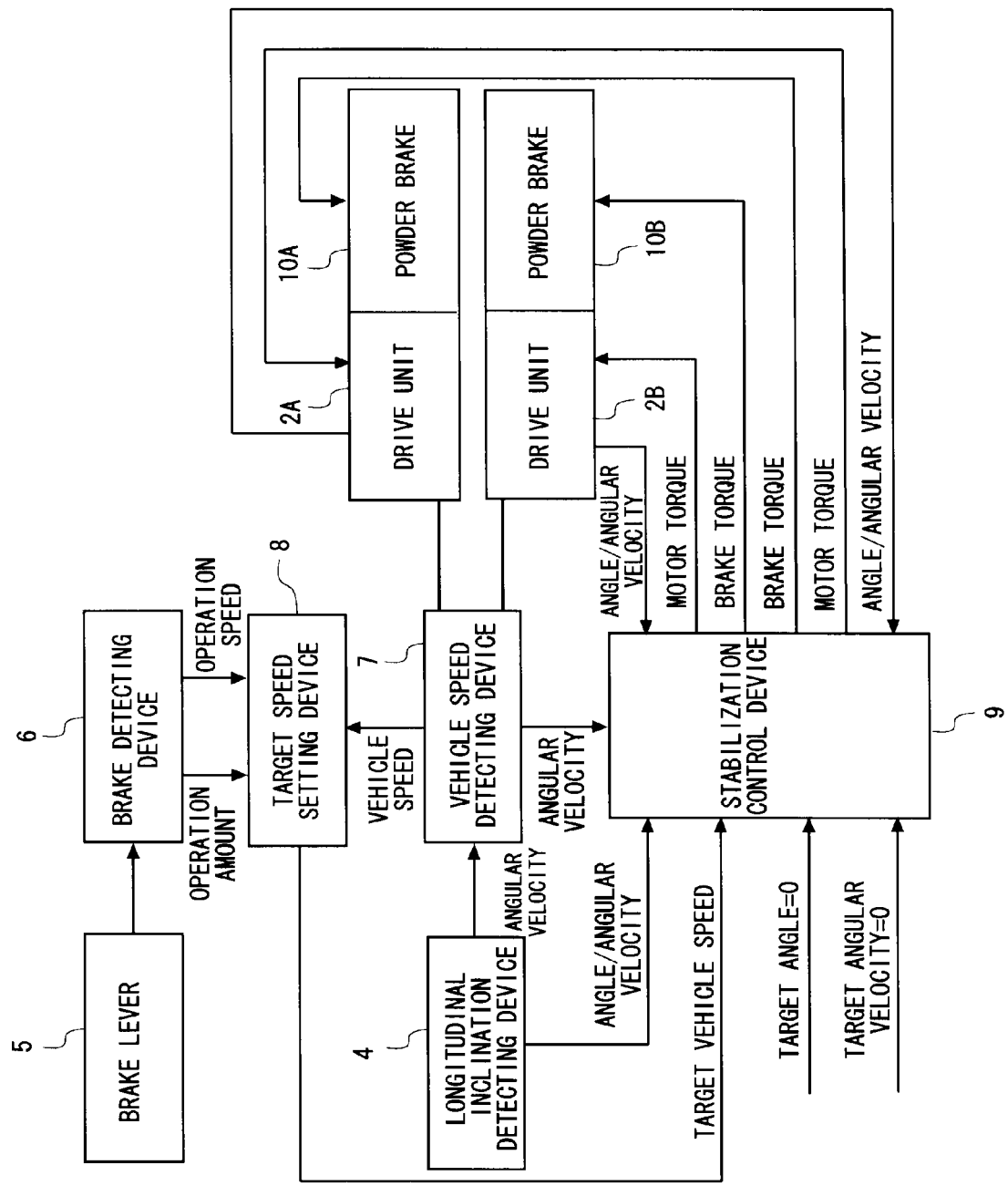
FIG. 3 is a functional block diagram for illustrating an operation thereof.

Further, an operation executed at the time of deceleration when the brake lever is operated is described with reference to FIG. 3. In FIG. 3, the brake detecting device 6 detects the operation amount and operation speed of the brake lever 5 operated by the passenger. The vehicle speed detecting device 7 determines a current vehicle speed based on the relative angular velocity between the body and the wheels, which is detected by the drive units 2A and 2B, and based on the vehicle angular velocity detected by the longitudinal inclination detecting device 4. The target speed setting device 8 determines a target deceleration based on the output of each of the brake detecting device 6 and the vehicle speed detecting device 7, thereby determining the target vehicle speed.

Figure 4:
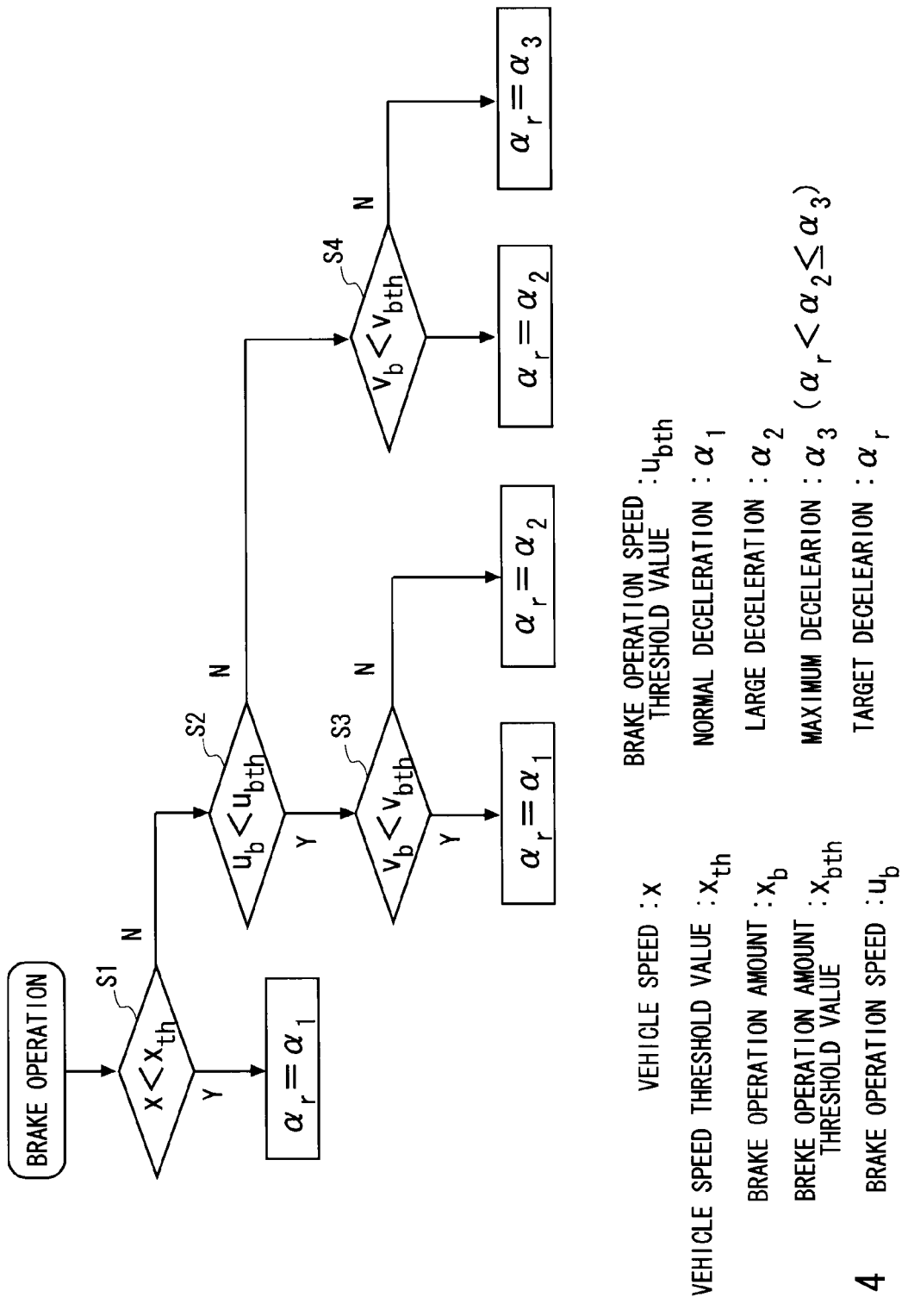
FIG. 4 is a flowchart for the illustration thereof.

FIG. 4 shows an example of a flowchart for generating the target deceleration. In FIG. 4, a vehicle speed x is first judged (Step S1). Further, in an area in which the vehicle speed x is low (x<xth: xth represents vehicle speed threshold value), it is not necessary to make the deceleration very high, not only in the case of speed adjustment but also in the case of stopping the vehicle, since the stopping distance is short. Thus, the deceleration is set as a normal deceleration (=α1).

Further, in an area in which the vehicle speed is high, a judgment of the magnitude of a brake operation amount ub (Step S2) and a judgment of the magnitude of a brake operation speed vb (Step S3) are made. Then, in the state where the brake operation amount ub is small (ub<ubth: ubth represents brake operation amount threshold value) and in the state where the brake operation speed vb is also small (vb<vbth: vbth represents brake operation speed threshold value), the speed adjustment seems to be intended, so the normal deceleration (=α1) is set.

On the other hand, in the state where the brake operation amount ub is small and the brake operation speed vb is large, a large deceleration (=α2) is set. Further, when the brake operation amount ub is large, the judgment of the magnitude of the brake operation speed vb (Step S4) is also made. Then, in the state where the brake operation speed vb is small (vb<vbth: vbth), the large deceleration (=α2) is set. Further, in the state where the brake operation amount and the brake operation speed are large, a sudden stop seems to be intended, so a maximum deceleration (=α3) is set.

Note that various combinations of the threshold values of the vehicle speed/brake operation amount/brake operation speed are possible. When each of the threshold values is set smaller for a beginner, the operation is switched to the safe side. The switching may be made according to individual taste. Further, the deceleration may be represented not only as three levels but as a function of the brake operation amount and brake operation speed to satisfy α=f(ub, vb).

Further, in FIG. 3, the stabilization control device 9 causes the vehicle to stably follow a target vehicle angle (=0, that is, horizontally maintained), a target vehicle angular velocity (=0, that is, maintained at the present angle), and a target vehicle speed. In the stabilization control device 9, it is determined how the torque necessary therefor is shared by the motors provided in the drive units 2A and 2B, and the powder brakes 10A and 10B.

Here, the powder brakes can only generate a friction torque (that is, can only generate torque acting in a direction opposite to the rotation direction of the drive units). Thus, the torque is basically generated by using the powder brakes when the rotation direction of the drive units is opposite to the direction of the necessary drive torque (hereinafter, referred to as "at the time of deceleration torque"), and by using the motors when the rotation direction of the drive units is the same as the direction of the necessary drive torque (hereinafter, referred to as "at the time of acceleration torque").

Note that various distribution methods as mentioned below, for example, are possible in this case.
1. The deceleration and posture stabilization are performed using only the powder brakes at the time of deceleration torque, and the acceleration and posture stabilization are performed using only the motor torque at the time of acceleration torque.
2. The deceleration and posture stabilization are performed using only the powder brakes at the time of deceleration torque equal to or larger than a certain threshold value, and the acceleration/deceleration and posture stabilization are performed using only the motors at the time of acceleration torque and at the time of deceleration torque equal to or smaller than the threshold value.
3. The deceleration and posture stabilization are performed by generating a certain percentage of the torque using the powder brakes and by generating the remaining torque using the motors at the time of deceleration torque, and the acceleration and posture stabilization are performed using only the motor torque at the time of acceleration torque.

Figure 5:
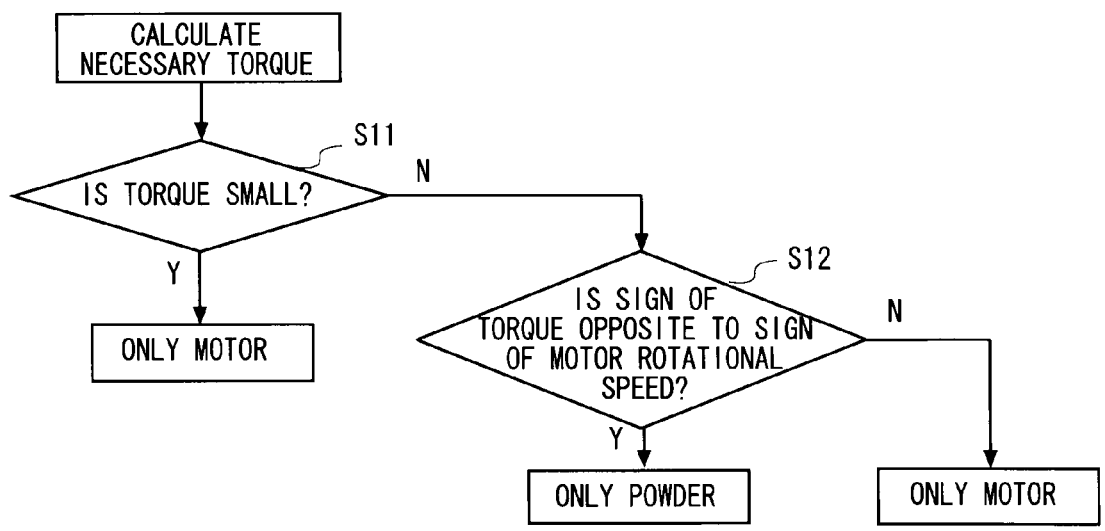
FIG. 5 is a flowchart for the illustration thereof.

First, the case of the item 1 is described in detail. FIG. 5 shows a flowchart for the torque distribution of this case. In this case, a judgment of the magnitude of the necessary torque (Step S11) and a judgment of the sign of each of the rotational speed of the motors and the torque (Step S12) are performed. Then, in a range in which the necessary torque is small (0.7 Nm in this case) in Step S11, braking is carried out using only the torque of the motors, since the motors can provide more precise control than the powder brakes.

Further, when the torque is large to some extent (0.7 Nm or more) and when the sign of the rotational speed of the motors is the same as the sign of the torque (that is, at the time of acceleration) in Step S12, only the torque of the motors is used also in this case, since the powder brakes cannot be used. Meanwhile, when the torque is large to some extent (0.7 Nm or more) and when the sign of the rotational speed of the motors is opposite to the sign of the torque (that is, at the time of deceleration), only the torque of the powder brakes is used.

Figure 6A:
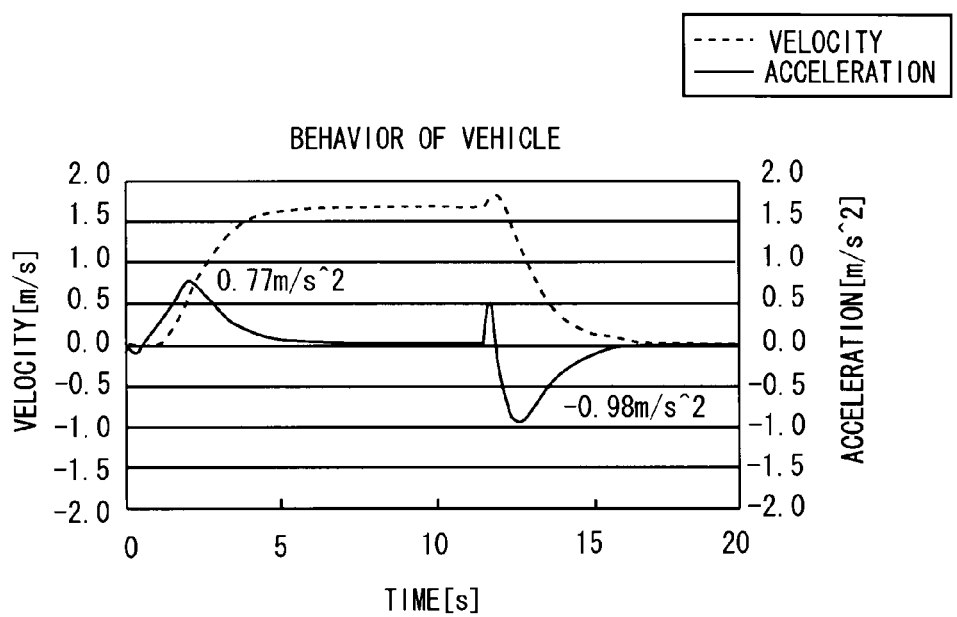
FIG. 6A is a waveform chart for the illustration thereof.
Figure 6B:
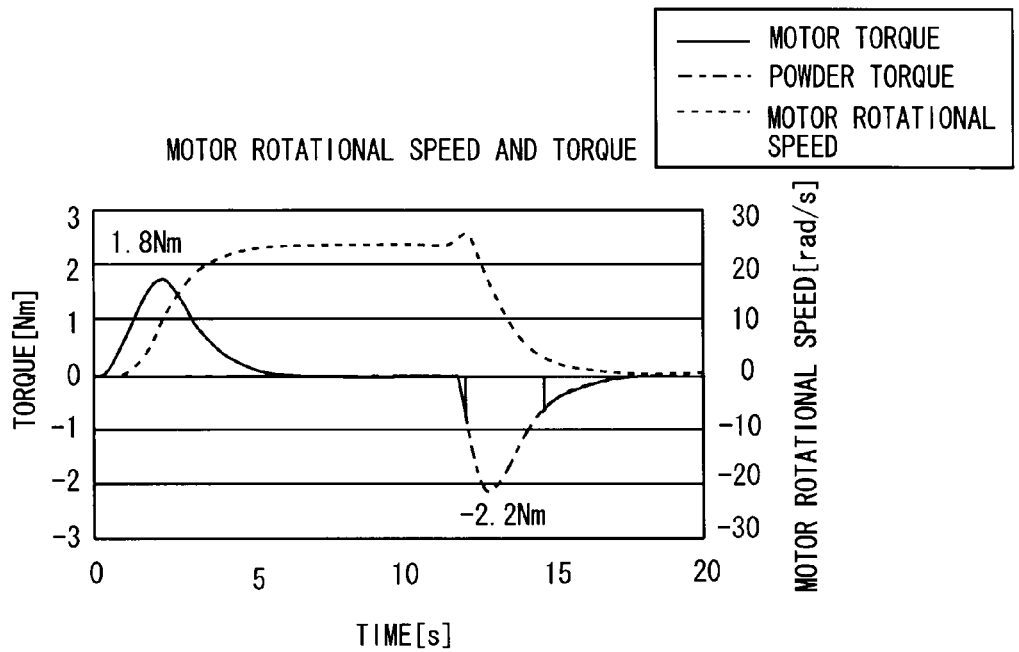
FIG. 6B is a waveform chart for the illustration thereof.

Through this control, as shown in FIG. 6, for example, an acceleration of 0.77 m/s2 is generated by a torque of 1.8 Nm at the time of acceleration, while a large deceleration of −0.98 m/s2 can be generated by a torque of −2.2 Nm, which is larger than that obtained at the time of acceleration, at the time of deceleration. That is, assuming that a maximum torque that can be generated by the motors is 1.8 Nm, a combination with the powder brakes enables deceleration using a torque of 2.2 Nm which is larger than the maximum torque.

Figure 7:
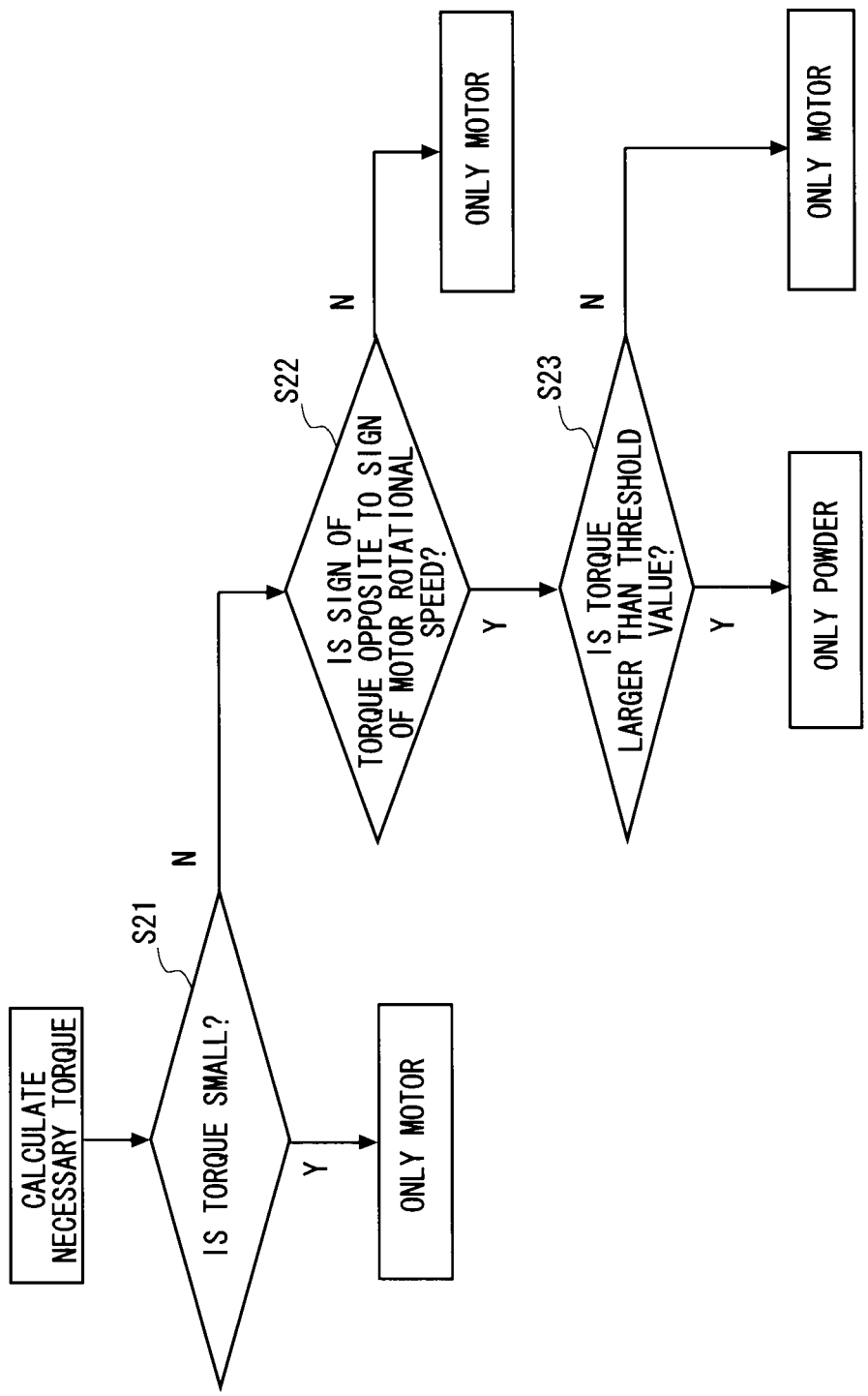
FIG. 7 is a flowchart for the illustration thereof.

Next, the case of the item 2 is described in detail. FIG. 7 shows a flowchart for the torque distribution of this case. In this case, a judgment of the magnitude of the necessary torque (Step S21), a judgment of the sign of each of the rotational speed of the motors and the torque (Step S22), and a judgment as to whether the torque exceeds a certain threshold value (Step S23) are performed. Further, the range in which the necessary torque is small in Step S21, and the case where the torque is large to some extent (0.7 Nm or more) and the sign of the rotational speed of the motors is the same as the sign of the torque in Step S22 (that is, at the time of acceleration) are similar to those in the case of the item 1.

On the other hand, in the case where the torque is large to some extent (0.7 Nm or more) in Step S21 and the sign of the rotational speed of the motors is opposite to the sign of the torque in Step S22 (that is, at the time of deceleration), and when the torque exceeds a certain threshold value (in this case, 1.8 Nm) in Step S23, only the torque of the powder brakes is used. When the torque is equal to or smaller than a certain threshold value (1.8 Nm), only the toque of the motors is used.

Figure 8A:
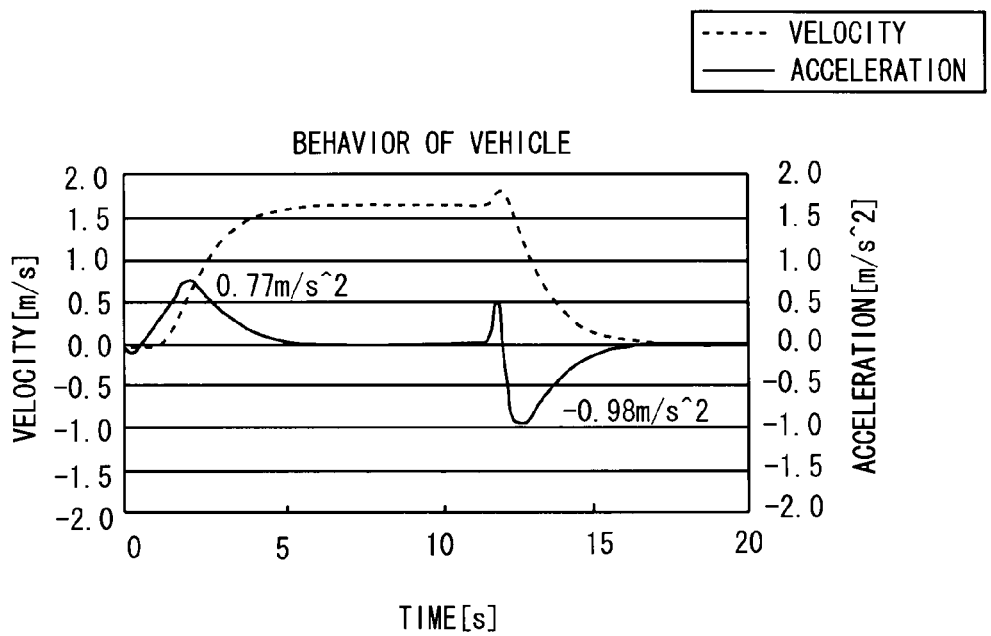
FIG. 8A is a waveform chart for the illustration thereof.
Figure 8B:
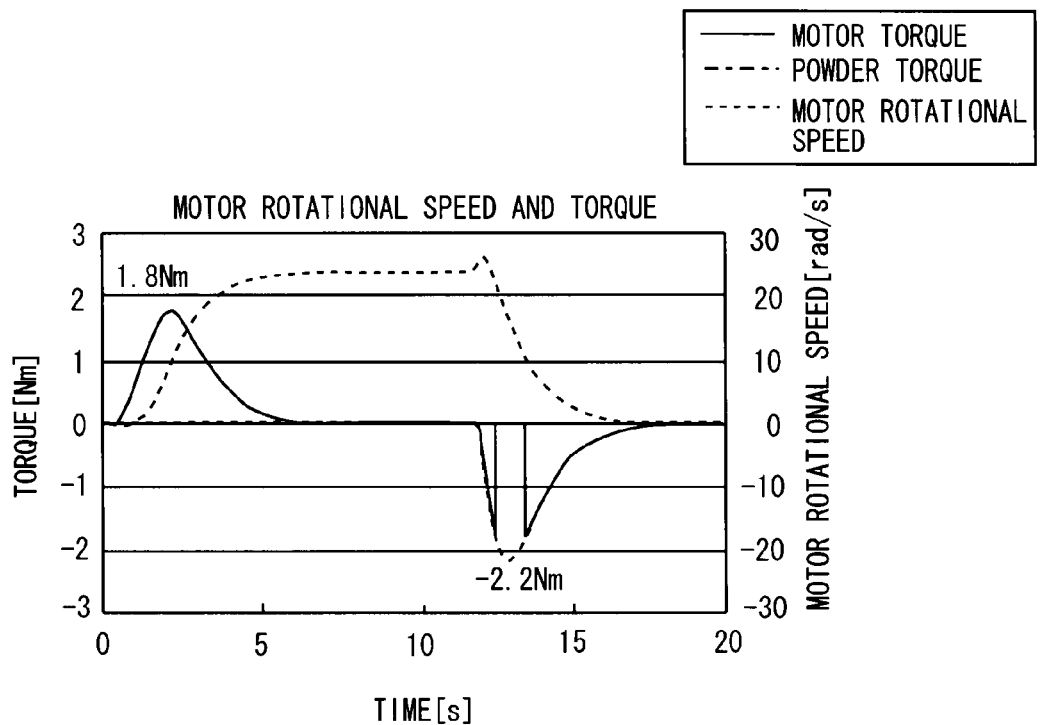
FIG. 8B is a waveform chart for the illustration thereof.

Through this control, as shown in FIG. 8, an acceleration of 0.77 m/s2 is generated by a torque of 1.8 Nm at the time of acceleration, while a large deceleration of −0.98 m/s2 can be generated by a large torque of −2.2 Nm at the time of deceleration. That is, assuming that the limit torque that can be generated by the motors is 1.8 Nm, a deceleration torque equal to or larger than the limit torque can be generated by a combination with the powder brakes.

Figure 9:
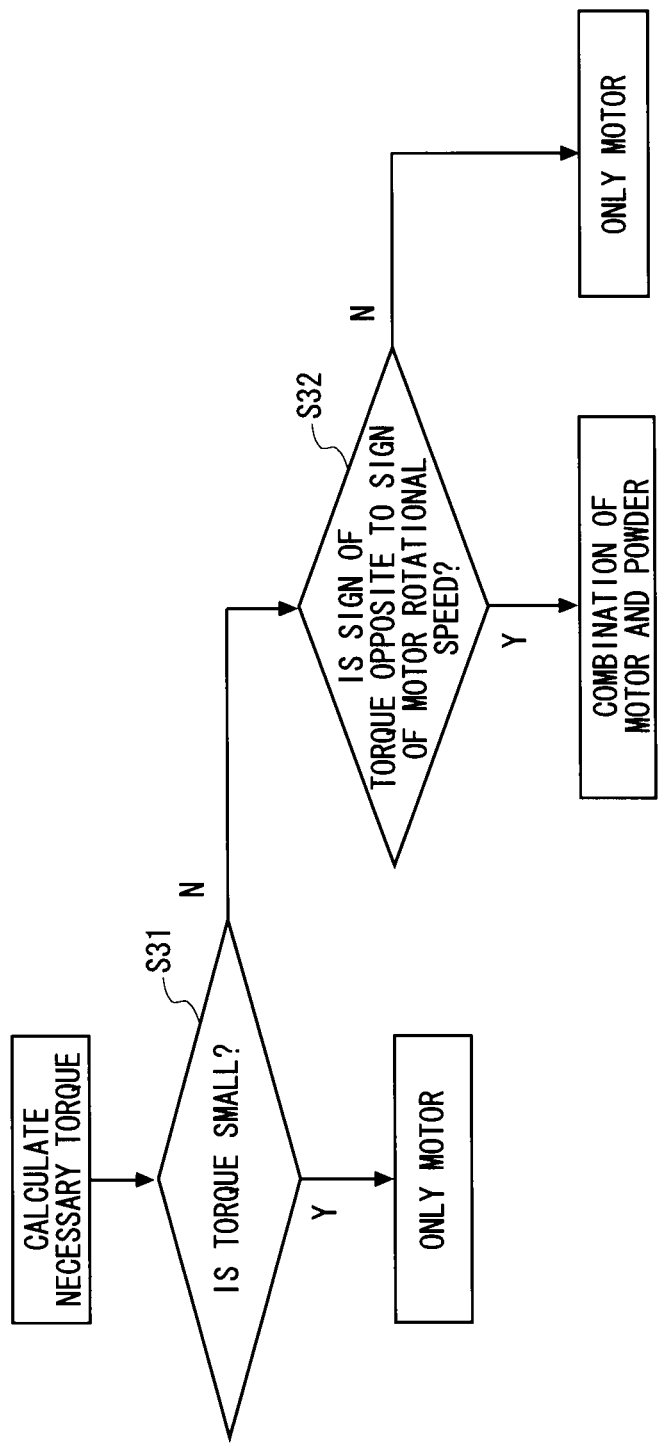
FIG. 9 is a flowchart for the illustration thereof.

Further, the case of the item 3 is described in detail. FIG. 9 shows a flowchart for the torque distribution of this case. In this case, a judgment of the magnitude of the necessary torque (Step S31) and a judgment of the sign of each of the rotational speed of the motors and the torque (Step S32) are performed. Then, in the range in which the necessary torque is small (in this case, 0.7 Nm) in Step S21, only the torque of the motors is used, since the motors can provide more precise control than the powder brakes.

Further, in the case where the torque is large to some extent (0.7 Nm or more) and the sign of the rotational speed of the motors is the same as the sign of the torque in Step S32 (that is, at the time of acceleration), the powder brakes cannot be used. For this reason, only the torque of the motors is used also in this case. On the other hand, in the case where the torque is large to some extent (0.7 Nm or more) and the sign of the rotational speed of the motors is opposite to the sign of the torque (that is, in the case of deceleration), only the torque of the motors is used also in this case, since the powder brakes cannot be used. Meanwhile, when the torque is large to some extent (0.7 Nm or more) and when the sign of the rotational speed of the motors is opposite to the sign of the torque (that is, at the time of deceleration), the powder brakes and the motors are used such that a certain percentage of the necessary torque is generated by the powder brakes and the remaining torque is generated by the motors.

Figure 10A:
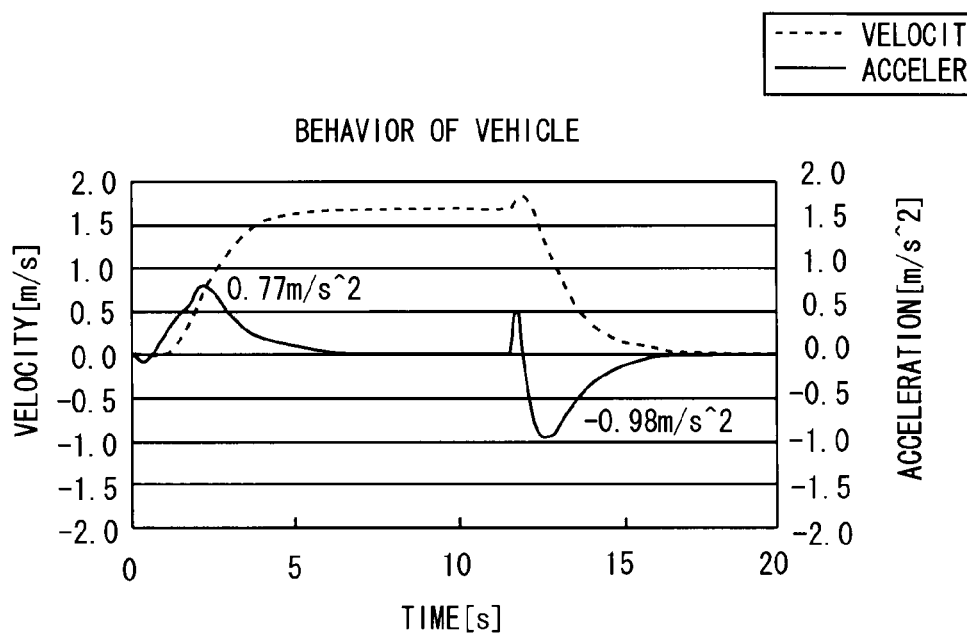
FIG. 10A is a waveform chart for the illustration thereof.
Figure 10B:
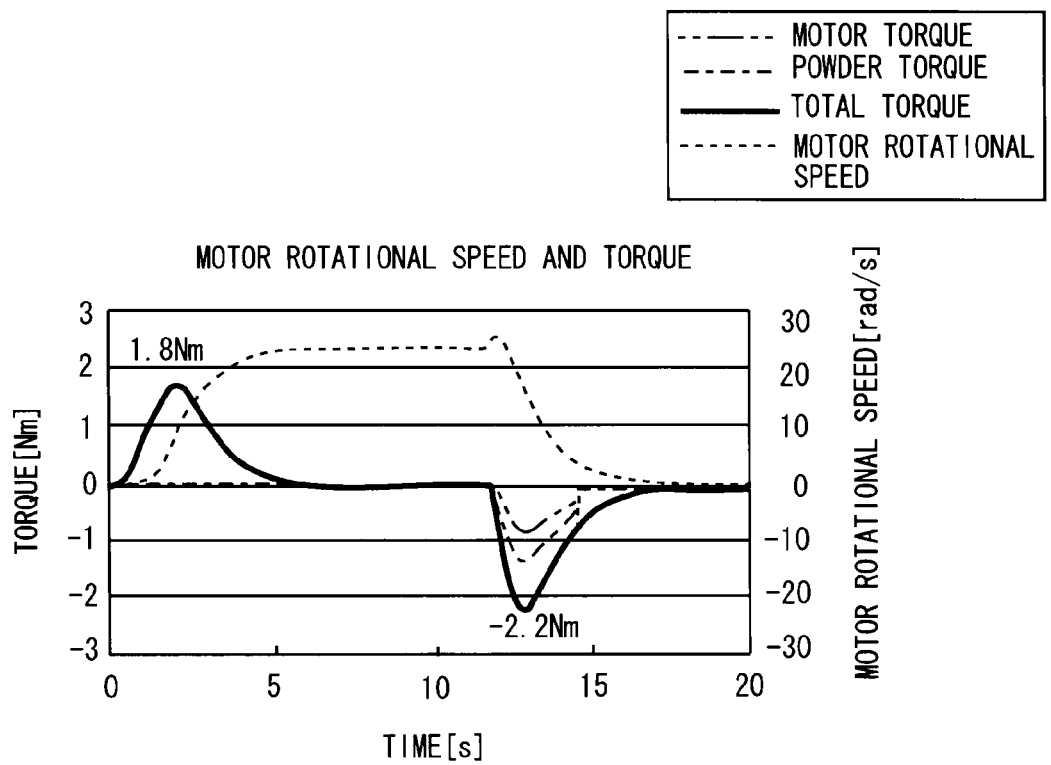
FIG. 10B is a waveform chart for the illustration thereof.

Through this control, as shown in FIG. 10, an acceleration of 0.77 m/s2 is generated by a torque of 1.8 Nm at the time of acceleration, while a large deceleration of −0.98 m/s2 can be generated by a large torque of −2.2 Nm at the time of deceleration. That is, assuming that the limit torque that can be generated by the motors is 1.8 Nm, a deceleration torque larger than the limit torque can be generated by a combination with the powder brakes.

Note that, even when the brake lever is not operated, the driving force and the braking force can be distributed to the motors and the powder brakes in accordance with the magnitude of the necessary torque in a similar manner as in the above-mentioned cases of the items 1 to 3. That is, the combination of the motors and the powder brakes can be used also in the case where the motors of the drive units 2A and 2B are driven by calculating the drive torque necessary for the control device 9 to stabilize the whole system in order to prevent the whole system from falling down, based on the relative angle/angular velocity between the body and the wheels, which is detected by the drive units 2A and 2B shown in FIG. 2, and based on the angle/angular velocity detected by the longitudinal inclination detecting device 4.

In the above-mentioned embodiment, the provision of the braking means that brakes two wheels directly enables the deceleration at a deceleration larger than a deceleration that can be generated by the motors alone. Thus, it is not necessary to use a large motor for generating a large deceleration and it is possible to prevent an increase in weight, power consumption, and cost. Further, a satisfactory braking control method used in combination with the braking means can be realized.

Note that, in the above-mentioned embodiment, the deceleration torque is constantly generated in such a case of traveling down a slope at a constant speed, so the constant speed can be maintained and the posture can be stabilized only by controlling the powder brakes. Further, the brake lever is continued to be gripped after stop (drive torque is 0), or the braking means (powder brakes) are driven through operation of a switch, thereby making it possible to cause the braking means to function as a parking brake.

Moreover, while the embodiment implemented using the powder brakes as the braking means has been described above, the present invention is not limited to any particular configuration or form, as long as the friction torque (frictional force) can be electrically controlled. Further, in terms of structure, instead of incorporating the drive units, a structure for pressing down the wheels from the outside (for example, disc brake) may be employed. In this regard, an embodiment of a vehicle provided with such a mechanical brake is described below.

Figure 11A:
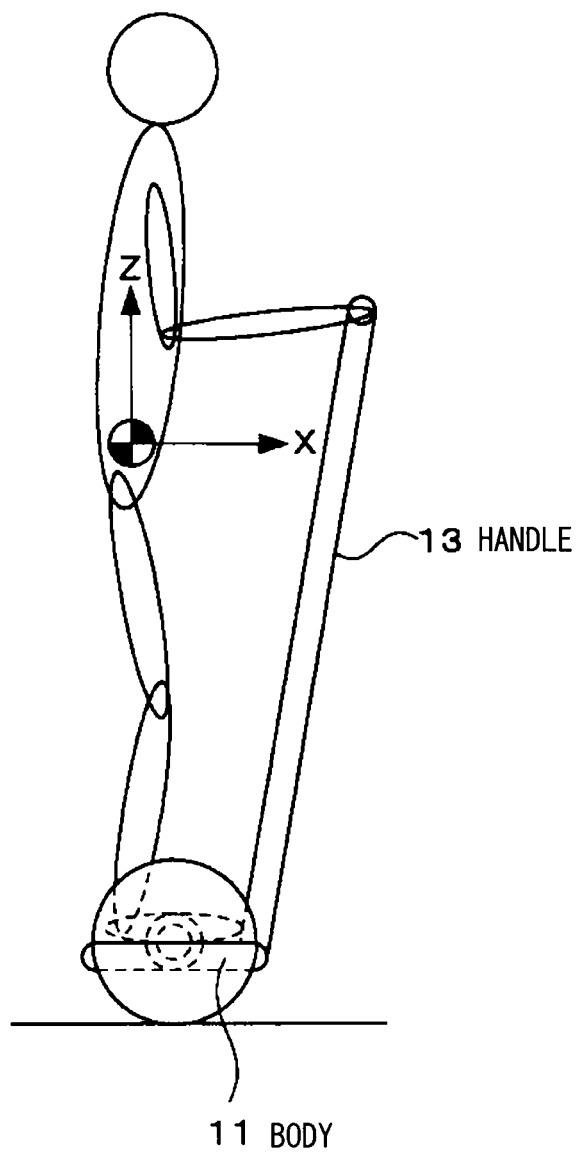
FIG. 11A is a structural diagram showing another embodiment of the parallel two-wheeled vehicle to which the traveling apparatus and the braking control method for the traveling apparatus according to the present invention are applied.
Figure 11B:
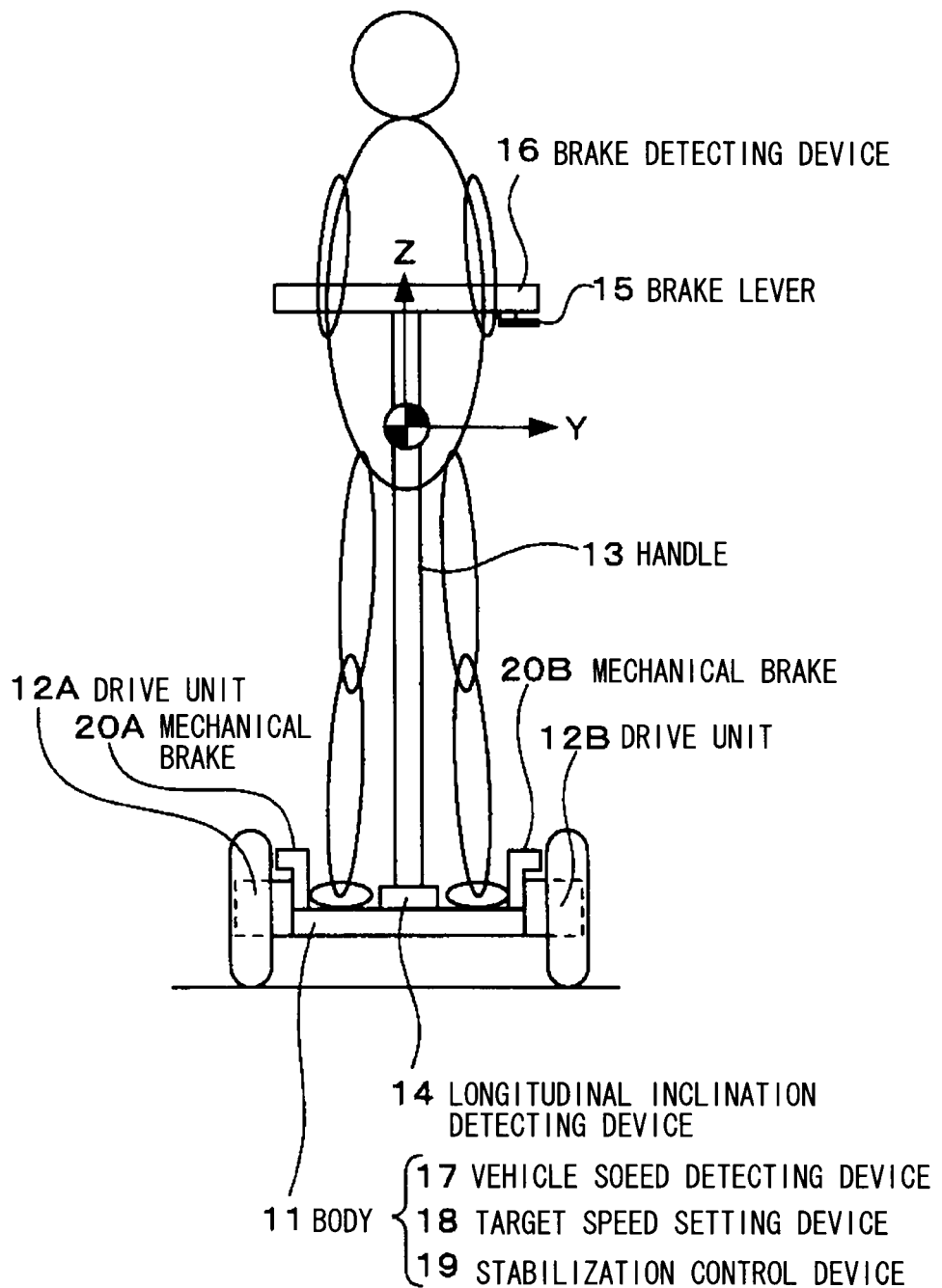
FIG. 11B is a structural diagram showing another embodiment of the parallel two-wheeled vehicle to which the traveling apparatus and the braking control method for the traveling apparatus according to the present invention are applied.

FIG. 11 show the structure of one embodiment of the parallel two-wheeled vehicle to which the traveling apparatus and the control method for the traveling apparatus according to the present invention are applied. Note that FIG. 11A shows a front view and FIG. 11B shows a side view. In FIG. 11, the parallel two-wheeled vehicle according to the present invention includes: a body (portion on which a passenger stands) 11; a pair of drive units 12A and 12B coaxially mounted to the body 11; a T-shaped handle 13 to be gripped by the passenger; a longitudinal (about Y-axis) inclination detecting device 14 of the body 11; and a brake lever 15.

Further, the base of the brake lever 15 is provided with a brake detecting device 16 that detects operational information (operation amount, operation speed) of the brake lever 15. Furthermore, the body 11 includes: a vehicle speed detecting device 17 that determines a vehicle speed based on a relative angular velocity between the body and wheels, which is detected by the drive units 12A and 12B, and based on an angular velocity detected by the longitudinal inclination detecting device 14; a target speed setting device 18 that sets a target vehicle speed based on an output of each of the brake detecting device 16 and the vehicle speed detecting device 17; and a stabilization control device 19 that controls the vehicle to stably follow its target angle/target angular velocity/target vehicle speed.

Moreover, mechanical brakes 20A and 20B are capable of applying a friction torque to the drive units 12A and 12B from the outside. Here, the mechanical brakes 20A and 20B generate a frictional force when the brake lever 15 is gripped, as in the case of a disc brake of a motorcycle, for example.

First, an operation executed during normal traveling (when the brake lever is not operated) is similar to that in the above-mentioned case of FIG. 2. That is, as shown in FIG. 2, the drive torque necessary for the control device 9 to stabilize the whole system in order to prevent the whole system from falling down is calculated based on the relative angle/angular velocity between the body and the wheels, which is detected by the drive units 2A and 2B, and based on the angle/angular velocity detected by the longitudinal inclination detecting device 4, thereby driving the motors of the drive units 2A and 2B. Thus, a forward/backward movement and acceleration/deceleration can be performed when the passenger shifts the center of mass in the front-and-back direction.

Figure 12:
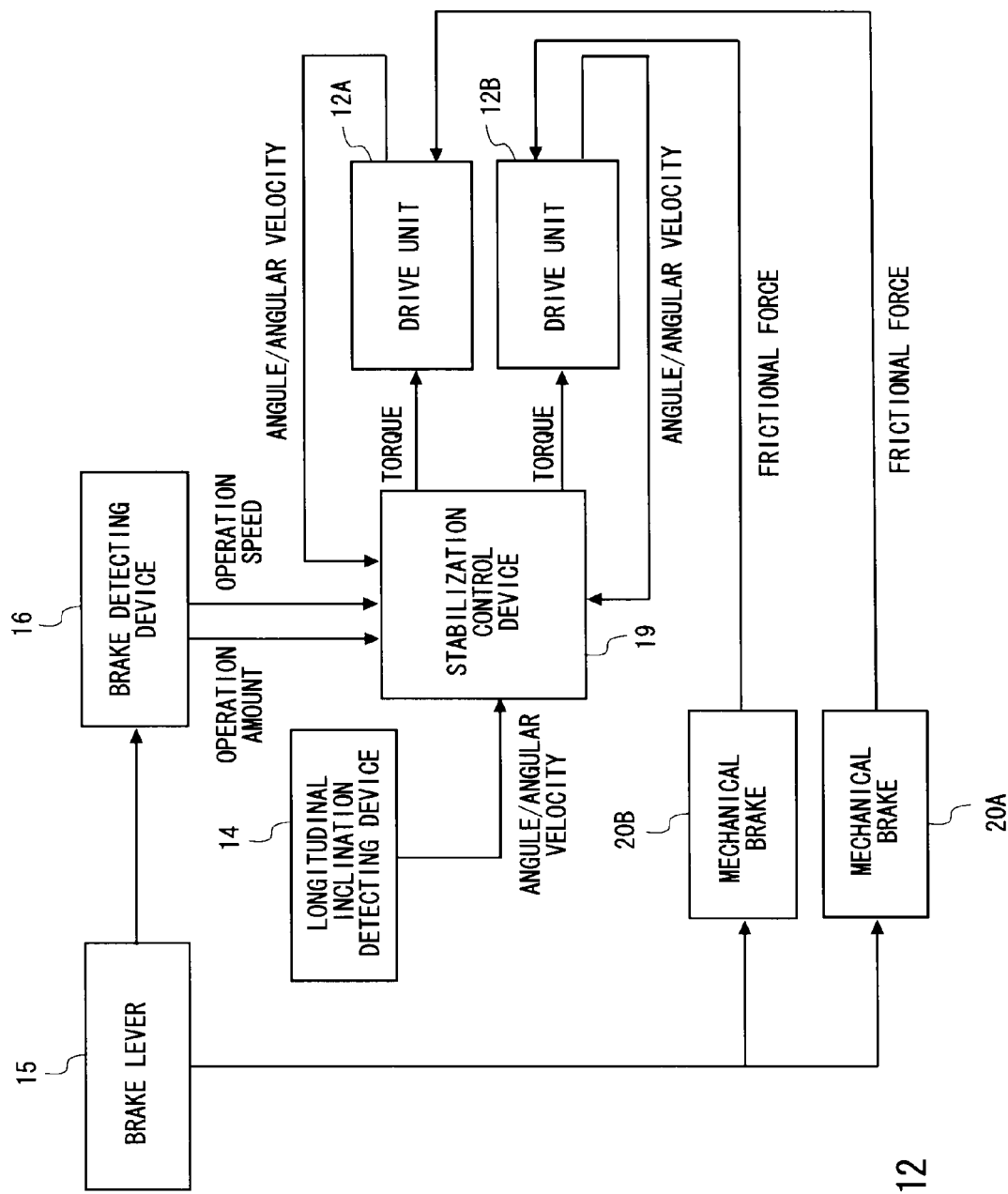
FIG. 12 is a functional block diagram for illustrating an operation thereof.

Meanwhile, an operation executed at the time of deceleration when the brake lever is operated is described with reference to FIG. 12. In FIG. 12, when the passenger operates the brake lever 15, the frictional force from the mechanical brakes 20A and 20B is applied to the drive units 12A and 12B. Then, the stabilization control device 19 causes the vehicle to stably follow the target vehicle angle (=0, that is, maintained horizontally). In this case, the frictional force applied to the drive units 12A and 12B from the outside is regarded as a disturbance, and the stabilization control device 19 controls the vehicle to be stabilized in the state where the vehicle is subjected to the disturbance.

Figure 13:
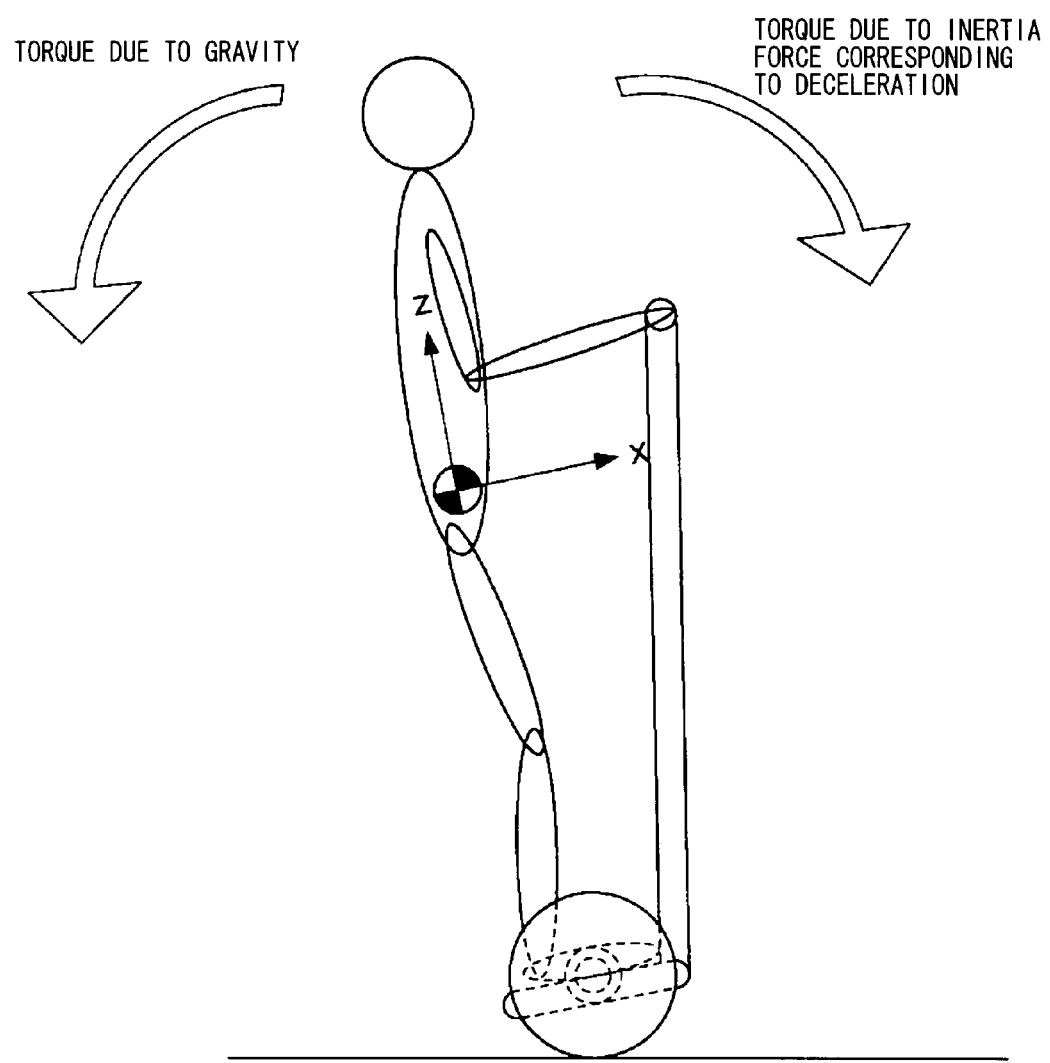
FIG. 13 is a diagram for illustrating an operation thereof.

In this case, a vehicle stable state refers to a state in which the vehicle is inclined backward in the traveling direction according to the magnitude of the disturbance and is decelerated to generate an inertia force that cancels out a backward torque, as shown in FIG. 13, for example. That is, the vehicle is decelerated.

Note that, in this case, the motors of the drive units 12A and 12B need to have an ability to generate a torque larger than the friction torque that can be generated by the mechanical brakes 20A and 20B. This is because it is conceivable that an excessively large frictional force may be generated, since the mechanical brakes 20A and 20B are operated by the passenger, and also in this case, the drive units 12A and 12B are required to generate the torque necessary for stabilizing the posture by overcoming the mechanical brakes 20A and 20B.

Also in this embodiment, at the time of deceleration, the deceleration can be performed by using the torque larger than the torque that can be generated by the motors alone, that is, by using a combination of the torque that can be generated by the motors and the torque that can be generated by the mechanical brakes. Note that the brake detecting device 16 detects the operation amount and operation speed of the brake lever 15 operated by the passenger, whereby a backward inclined posture corresponding to a predicted deceleration may be set in advance.

According to the traveling apparatus of the present invention, there are provided drive means to independently drive two wheels arranged in parallel, and a housing to couple the two wheels. The housing includes detecting means to detect a posture angle of the housing, and brake operation means. The traveling apparatus travels by setting a drive torque of each of the two wheels in accordance with information about the detected posture angle, and brakes the two wheels by controlling the drive torque of each of the two wheels, which is set by the drive means, in accordance with an operation amount of the brake operation means. The traveling apparatus includes braking means to brake the two wheels directly. The braking means brakes the two wheels in accordance with the operation amount of the brake operation means when the drive torque of each of the two wheels, which is set by the drive means, is set in a direction opposite to a traveling direction of the housing. Thus, it possible to perform the deceleration at a deceleration larger than a deceleration that can be generated by the motors alone, thereby eliminating the necessity of using a large motor for generating a large deceleration and making it possible to prevent an increase in weight, power consumption, and cost.

Further, according to the braking control method for the traveling apparatus of the present invention, two wheels arranged in parallel are driven independently, and the traveling apparatus travels by detecting a posture angle of a housing to couple the two wheels and by setting a drive torque of each of the two wheels in accordance with information about the detected posture angle, and brakes the two wheels by detecting an operation amount of brake operation means and by controlling the drive torque of each of the two wheels in accordance with the operation amount of the brake operation means. The two wheels can be braked directly, and the two wheels are braked directly when the set drive torque of each of the two wheels is set in a direction opposite to a traveling direction of the housing. Thus, a satisfactory braking control method used in combination with the braking means is proposed.

Note that the present invention is not limited to the embodiments described above, and various modifications can be made without departing from the spirit of the present invention.

INDUSTRIAL APPLICABILITY

When a parallel two-wheeled vehicle is provided with braking means to brake wheels directly, a traveling apparatus that permits satisfactory braking control and a braking control method for the traveling apparatus can be widely applied.

The invention claimed is:

1. A traveling apparatus comprising:
   a driver that independently drives two wheels arranged in parallel;
   a housing to couple the two wheels, the housing including a detector that detects a posture angle of the housing, the traveling apparatus traveling by setting a drive torque of each of the two wheels in accordance with information about the detected posture angle;
   a braking device that brakes the two wheels directly in response to a braking command; and
   a controller configured to determine a target vehicle speed in response to the braking command for the two wheels to control the traveling apparatus to stably follow a target vehicle angle, a target vehicle angular velocity, and the determined target vehicle speed, and the controller controlling at least one of the driver and the braking device to carry out braking and the controller stabilizing the posture angle during braking by controlling a braking torque generated by the braking device and the drive torque set by the driver,
   when a deceleration torque generated according to the target vehicle speed is larger than a predetermined value, the controller is configured to carry out braking of the two wheels by using a combination of the driver and the braking device.

2. The traveling apparatus according to claim 1, wherein:
   when the deceleration torque is equal to or smaller than the predetermined value, the controller is configured to carry out braking of the two wheels by the driver.

3. The traveling apparatus according to claim 1, further comprising:
   a brake operator,
   wherein the braking device brakes the two wheels in accordance with an operation amount of the brake operator.

4. The traveling apparatus according to claim 1,
   wherein, when the drive torque of each of the two wheels, which is set by the driver, is 0, the controller is configured to carry out braking to stop the two wheels by using the braking device.

5. A braking control method for a traveling apparatus, the traveling apparatus including: a driver that independently drives two wheels arranged in parallel; and a detector that detects a posture angle of a housing to couple the two wheels, the traveling apparatus traveling by setting a drive torque of each of the two wheels in accordance with information about the detected posture angle, the method comprising:
   enabling the two wheels to be braked directly in response to a braking command;
   determining a target vehicle speed in response to the braking command for the two wheels to control the traveling apparatus to stably follow a target vehicle angle, a target vehicle angular velocity, and the determined target vehicle speed; and braking the two wheels by at least one of the braking device and the driver; and stabilizing the posture angle during the braking by controlling a braking torque generated by the braking device and the drive torque set by the driver; and wherein the braking the two wheels includes by using a combination of the driver and the braking device, when a deceleration torque generated according to the target vehicle speed is larger than a predetermined value.

6. A traveling apparatus comprising:

a driver that independently drives two wheels arranged in parallel;

a housing to couple the two wheels, the housing including a detector that detects a posture angle of the housing, and a brake operator, the traveling apparatus traveling by setting a drive torque of each of the two wheels in accordance with information about the detected posture angle;

a braking device that brakes the two wheels directly; and a controller configured to control at least one of the driver and the braking device to brake the two wheels in accordance with an operation amount of the brake operator and to stabilize the posture angle during braking by controlling a braking torque generated by the braking device and the drive torque set by the driver; and the controller configured to control braking of the two wheels by using a combination of the driver and the braking device, when a drive torque of each of the two wheels is set in a direction opposite to a traveling direction of the housing, and the controller is configured to control braking of the two wheels using only the driver, when the drive torque of each of the two wheels is equal to or smaller than a predetermined value.

* * * * *